No. 813,031. PATENTED FEB. 20, 1906.
A. B. ALLEN.
NUT LOCK.
APPLICATION FILED MAR. 21, 1905.

Witnesses
Louis C. Stark
Hubert D. Lawson

Inventor
A. B. Allen,
By W. T. Fitzgerald & Co.,
Attorneys

UNITED STATES PATENT OFFICE.

AARON BURR ALLEN, OF PUEBLO, COLORADO.

NUT-LOCK.

No. 813,031.  Specification of Letters Patent.  Patented Feb. 20, 1906.

Application filed March 21, 1905. Serial No. 251,284.

*To all whom it may concern:*

Be it known that I, AARON BURR ALLEN, a citizen of the United States, residing at Pueblo, in the county of Pueblo and State of Colorado, have invented certain new and useful Improvements in Nut-Locks; and I do hereby declare the following to be a full, clear, and exact description of the invention, such as will enable others skilled in the art to which it appertains to make and use the same.

My invention relates to nut-locks; and its object is to provide a simple device of inexpensive construction which can be readily applied to a nut when the same is in any of its various positions and which will hold the nut securely against accidental rotation.

Another object is to provide a lock for holding two nuts at the same time, said lock being adjustable longitudinally, so as to adapt it for use upon nuts at different distances apart.

With the above and other objects in view the invention consists of a rod bent to fit snugly upon a nut, the free end of this rod being hooked to engage and secure any suitable holding device. By providing two adjoining nuts with rods of this character and disposing them in opposite directions the hooked ends thereof can be placed in engagement so that the employment of securing means is rendered unnecessary.

The invention also consists of the further novel constructions and combination of parts hereinafter more fully described, and pointed out in the claims.

In the accompanying drawings I have shown the preferred forms of my invention.

Figure 1:
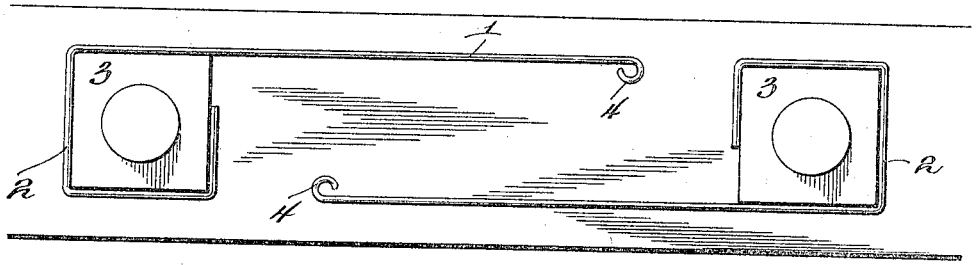
Figure 2:
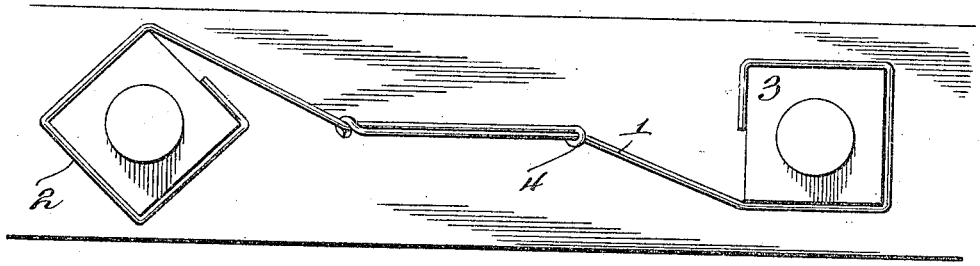

In said drawings, Figure 1 is an elevation showing two nuts provided with my improved locks, said locks being shown detached. Fig. 2 is a similar view showing the locking-rods connected.

Referring to the figures by numerals of reference, 1 is a rod having an angular extension 2 formed at one end thereof and adapted to fit snugly upon the sides of the nut 3. The free end of the rod is hooked, as shown at 4, and where two nuts are disposed adjacent each other one of the rods 1 is placed on each of the nuts and the hooked ends thereof are caused to interlock, as shown in Fig. 2. The rods 1 are of malleable metal, and therefore can be bent so as to fit a nut when the same is in any of its various positions, and after the two rods have been brought together, as shown in Fig. 2, the nuts engaged by them will be securely held against rotation.

Having thus fully described my invention, what I therefore claim as new, and desire to secure by Letters Patent, is—

1. A nut-lock comprising oppositely-extending rods having overlapping hooked ends slidably connecting each other, and angular extensions formed by the rods and adapted to receive nuts therein.

2. A nut-lock comprising oppositely-disposed, similar hooked rods overlapping and slidably connected, each of said rods having an angular extension adapted to receive and fit snugly upon a nut.

In testimony whereof I have signed my name to this specification in the presence of two subscribing witnesses.

AARON BURR ALLEN.

Witnesses:
 O. D. ALLEN,
 ISAAC BUTZ.